US006321335B1

(12) United States Patent
Chu

(10) Patent No.: US 6,321,335 B1
(45) Date of Patent: Nov. 20, 2001

(54) PASSWORD PROTECTED MODULAR COMPUTER METHOD AND DEVICE

(75) Inventor: William W. Y. Chu, Los Altos, CA (US)

(73) Assignee: ACQIS Technology, Inc., Mountain View, CA (US)

( * ) Notice: Subject to any disclaimer, the term of this patent is extended or adjusted under 35 U.S.C. 154(b) by 0 days.

(21) Appl. No.: 09/183,493

(22) Filed: Oct. 30, 1998

(51) Int. Cl.$^7$ .................................................... G06F 13/00
(52) U.S. Cl. ........................... 713/200; 713/202; 710/101
(58) Field of Search .................................. 713/200, 202; 710/101

(56) References Cited

U.S. PATENT DOCUMENTS

| 5,539,616 | 7/1996 | Kikinis | 361/686 |
|---|---|---|---|
| 5,673,174 | 9/1997 | Hamirani | 361/686 |
| 6,216,185 | * 4/2001 | Chu . | |

FOREIGN PATENT DOCUMENTS

WO97/00481  1/1997  (WO) .

OTHER PUBLICATIONS

Jesse Berst's Anchor Desk, http://www.zdnet.com/anchordesk/talkback/talkback_56555.html.
Jesse Berst's Anchor Desk, http://www.zdnet.com/anchordesk/story/story_1504.html.
Rick Boyd–Merritt, "Upgradable–PC effort takes divergent paths", http://techweb.cmp.com/eet/news/97/949news/effort.html.
Dirk S. Faegre et al., "CTOS Revealed", http://www.byte.com/art/9412/sec13/art2.htm.
Kelly Spang, "Component House: Design Technology for PCs in a snap'—NeoSystmes Offers Building Blocks", Computer Reseller News, Apr. 21, 1997, Issue 732, Section: Channel Assembly, http://www.techweb.com/se/directlink.cgi?CRN19970421S0054.
"Think Modular", PC Magazine, Jun. 10, 1997, wysiwyg://60/http://homezdnet.com/pcmag/issues/1611/pcmg0072.htm.

* cited by examiner

Primary Examiner—Ly V. Hua
(74) Attorney, Agent, or Firm—Townsend&Townsend& Crew LLP

(57) ABSTRACT

A method and device for securing a removable Attached Computer Module ("ACM") 10. ACM 10 inserts into a Computer Module Bay ("CMB") 40 within a peripheral console to form a functional computer such as a desktop computer or portable computer. The present ACM 10 includes a locking system, which includes hardware and software 600, 700, to prevent accidental removal or theft of the ACM from the peripheral console. While ACM is in transit, further security is necessary against illegal or unauthorized use. If ACM contains confidential data, a high security method is needed to safeguard against theft.

23 Claims, 7 Drawing Sheets

ND DEVICE

PASSWORD PROTECTED MODULAR COMPUTER METHOD AND DEVICE

CROSS REFERENCE TO RELATED APPLICATIONS

The following two commonly-owned copending applications, including this one, are being filed concurrently and the other one is hereby incorporated by reference in their entirety for all purposes:

1. U.S. patent application Ser. No. 09/183,816, William W. Y. Chu, entitled, "Modular Computer Security Method and Device". and 2. U.S. patent application Ser. No. 09/183,493, William W. Y. Chu, entitled, "Password Protected Modular Computer Method and Device".

BACKGROUND OF THE INVENTION

The present invention relates to computing devices. More particularly, the present invention provides a method and device for securing a personal computer or set-top box using password protection techniques. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use. The docking station typically includes a separate monitor, keyboard, mouse, and the like and is generally incompatible with other desktop PCs. The docking station is also generally not compatible with portable computers of other vendors. Another drawback to this approach is that the portable computer typically has lower performance and functionality than a conventional desktop PC. For example, the processor of the portable is typically much slower than processors in dedicated desktop computers, because of power consumption and heat dissipation concerns. As an example, it is noted that at the time of drafting of the present application, some top-of-the-line desktops include 400 MHz processors, whereas top-of-the-line notebook computers include 266 MHz processors.

Another drawback to the docking station approach is that the typical cost of portable computers with docking stations can approach the cost of having a separate portable computer and a separate desktop computer. Further, as noted above, because different vendors of portable computers have proprietary docking stations, computer users are held captive by their investments and must rely upon the particular computer vendor for future upgrades, support, and the like.

Thus what is needed are computer systems that provide reduced user investment in redundant computer components and provide a variable level of performance based upon computer configuration.

SUMMARY OF THE INVENTION

According to the present invention, a technique including a method and device for securing a computer module using a password in a computer system is provided. In an exemplary embodiment, the present invention provides a security system for an attached computer module ("ACM"). In an embodiment, the ACM inserts into a Computer Module Bay (CMB) within a peripheral console to form a functional computer.

In a specific embodiment, the present invention provides a computer module. The computer module has an enclosure that is insertable into a console. The module also has a central processing unit (i.e., integrated circuit chip) in the enclosure. The module has a hard disk drive in the enclosure, where the hard disk drive is coupled to the central processing unit. The module further has a programmable memory device in the enclosure, where the programmable memory device can be configurable to store a password for preventing a possibility of unauthorized use of the hard disk drive and/or other module elements. The stored password can be any suitable key strokes that a user can change from time to time. In a further embodiment, the present invention provides a permanent password or user identification code stored in flash memory, which also can be in the processing unit, or other integrated circuit element. The permanent password or user identification code is designed to provide a permanent "finger print" on the attached computer module.

In a specific embodiment, the present invention provides a variety of methods. In one embodiment, the present invention provides a method for operating a computer system such as a modular computer system and others. The method includes inserting an attached computer module ("ACM") into a bay of a modular computer system. The ACM has a microprocessor unit (e.g., microcontroller, microprocessor) coupled to a mass memory storage device (e.g., hard disk). The method also includes applying power to the computer system and the ACM to execute a security program, which is stored in the mass memory storage device. The method also includes prompting for a user password from a user on a display (e.g., flat panel, CRT). In a further embodiment, the present method includes a step of reading a permanent password or user identification code stored in flash memory, or other integrated circuit element. The permanent password or user identification code provides a permanent finger print on the attached computer module. The present invention includes a variety of these methods that can be implemented in computer codes, for example, as well as hardware.

Numerous benefits are achieved using the present invention over previously existing techniques. The present invention provides mechanical and electrical security systems to prevent theft or unauthorized use of the computer system in a specific embodiment. Additionally, the present invention substantially prevents accidental removal of the ACM from the console. In some embodiments, the present invention prevents illegal or unauthorized use during transit. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached FIGS.

DESCRIPTION OF SPECIFIC EMBODIMENTS

I. System Hardware

Figure 1:
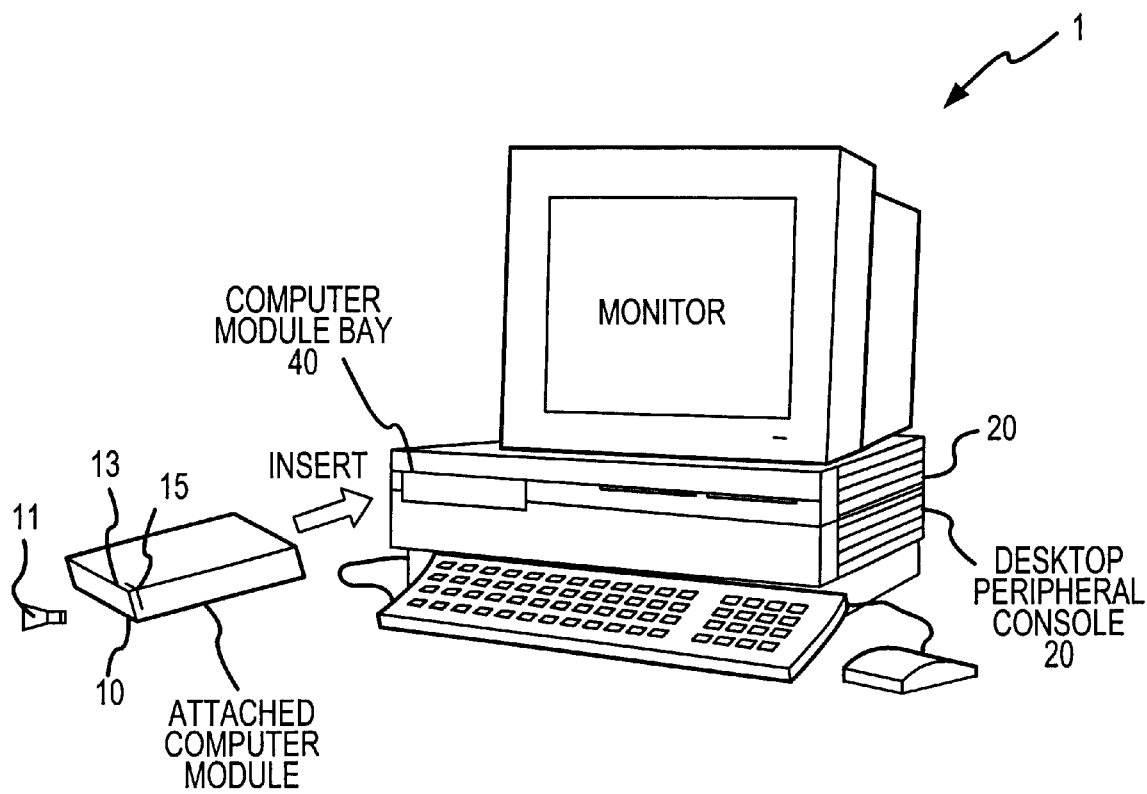
FIG. 1 is a simplified diagram of a computer system according to an embodiment of the present invention.

FIG. 1 is a simplified diagram of a computer system 1 according to an embodiment of the present invention. This diagram is merely an illustration and should not limit the scope of the claims herein. One of ordinary skill in the art would recognize other variations, modifications, and alternatives. The computer system 1 includes an attached computer module (i.e., ACM) 10, a desktop console 20, among other elements. The computer system is modular and has a variety of components that are removable. Some of these components (or modules) can be used in different computers, workstations, computerized television sets, and portable or laptop units.

In the present embodiment, ACM 10 includes computer components, as will be described below, including a central processing unit ("CPU"), IDE controller, hard disk drive, computer memory, and the like. The computer module bay (i.e., CMB) 40 is an opening or slot in the desktop console. The CMB houses the ACM and provides communication to and from the ACM. The CMB also provides mechanical protection and support to ACM 10. The CMB has a mechanical alignment mechanism for mating a portion of the ACM to the console. The CMB further has thermal heat dissipation sinks, electrical connection mechanisms, and the like. Some details of the ACM can be found in co-pending patent application Nos. 09/149,882 and 09/149,548 filed Sep. 8, 1998, commonly assigned, and hereby incorporated by reference for all purposes.

In a preferred embodiment, the present system has a security system, which includes a mechanical locking system, an electrical locking system, and others. The mechanical locking system includes at least a key 11. The key 11 mates with key hole 13 in a lock, which provides a mechanical latch 15 in a closed position. The mechanical latch, in the closed position, mates and interlocks the ACM to the computer module bay. The mechanical latch, which also has an open position, allows the ACM to be removed from the computer module bay. Further details of the mechanical locking system are shown in the Fig. below.

Figure 2:
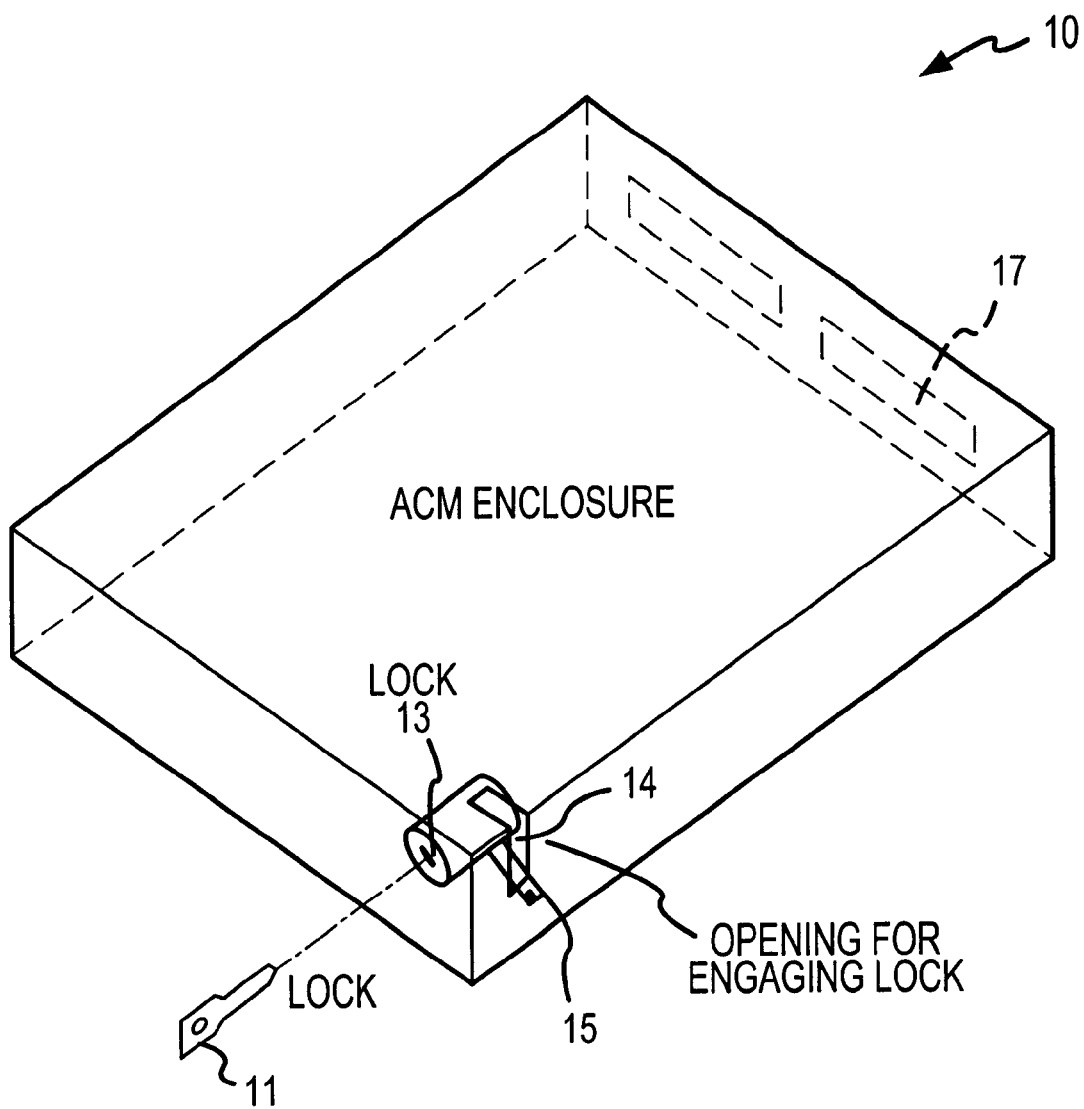
FIG. 2 is a simplified diagram of a computer module according to an embodiment of the present invention.

FIG. 2 is a simplified diagram of a computer module 10 according to an embodiment of the present invention. This diagram is merely an illustration and should not limit the scope of the claims herein. One of ordinary skill in the art would recognize other variations, modifications, and alternatives. Some of the reference numerals are similar to the previous Fig. for easy reading. The computer module 10 includes key 11, which is insertable into keyhole 13 of the lock. The lock has at least two position, including a latched or closed position and an unlatched or open position. The latched position secures the ACM to the computer module bay. The unlatched or open position allows the ACM to be inserted into or removed from the computer bay module. As shown, the ACM also has a slot or opening 14, which allows the latch to move into and out of the ACM. The ACM also has openings 17 in the backside for an electrical and/or mechanical connection to the computer module bay, which is connected to the console.

Figure 3:
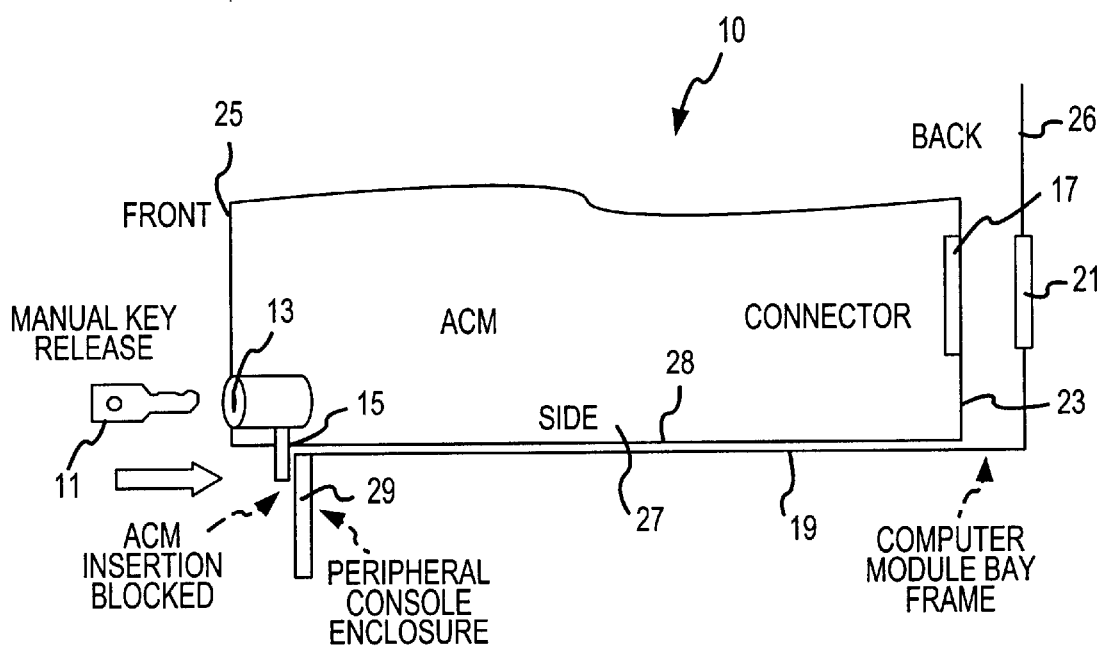
FIG. 3 is a simplified side-view diagram of a computer module according to an embodiment of the present invention.

FIG. 3 is a simplified side-view diagram of a computer module according to an embodiment of the present invention. This diagram is merely an illustration and should not limit the scope of the claims herein. One of ordinary skill in the art would recognize other variations, modifications, and alternatives. Some of the reference numerals are similar to the previous FIG. for easy reading. As shown, the ACM module inserts into the computer module bay frame 19, which is in the console. A side 27 and a bottom 19 of ACM slide and fit firmly into the computer module bay frame, which has at least a bottom portion 19 and back portion 26. A backside 23 of the ACM faces backside 26 of the frame. ACM also has a front-side or face 25 that houses the lock and exposes the keyhole 13 to a user. The key 11 is insertable from the face into the keyhole.

As the ACM inserts into the frame, connector 17 couples and inserts into connector 21. Connector 17 electrically and mechanically interface elements of the ACM to the console through connector 21. Latch 14 should be moved away from the bottom side 19 of the module bay frame before inserting the ACM into the frame. Once the ACM is inserted fully into the frame, latch 15 is placed in a closed or lock position, where it keeps the ACM firmly in place. That is, latch 15 biases against a backside portion 29 of the ACM enclosure to hold the ACM in place, where the connector 17 firmly engages, electrically and mechanically, with connector 21. To remove the ACM, latch 15 is moved away or opened from the back side portion of the ACM enclosure. ACM is manually pulled out of the computer module bay frame, where connector 17 disengages with connector 21. As shown, the key 11 is used to selectively move the latch in the open or locked position to secure the ACM into the frame module.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present security system are described in more detail below.

Figure 4:
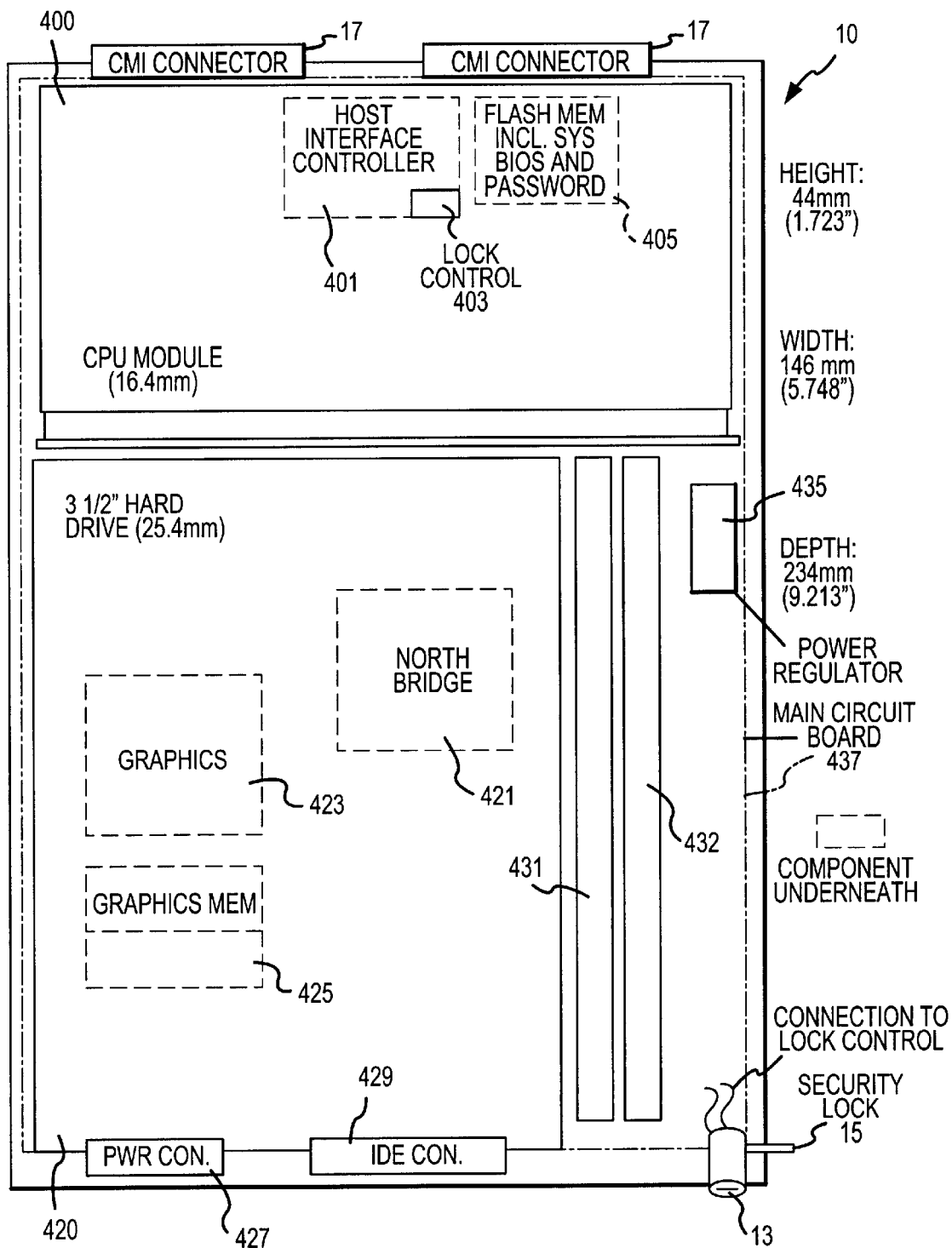
FIG. 4 is a simplified layout diagram of a security system for a computer system according to an embodiment of the present invention.

FIG. 4 is a simplified layout diagram of a security system for a computer system according to an embodiment of the present invention. This diagram is merely an illustration and should not limit the scope of the claims herein. One of ordinary skill in the art would recognize other variations, modifications, and alternatives. The layout diagram illustrates the top-view of the module 10, where the backside components (e.g., Host Interface Controller) are depicted in dashed lines. The layout diagram has a first portion, which includes a central processing unit ("CPU") module 400, and a second portion, which includes a hard drive module 420. A common printed circuit board 437 houses these modules and the like. Among other features, the ACM includes the central processing unit module 400 with a cache memory 405, which is coupled to a north bridge unit 421, and a host interface controller 401. The host interface controller includes a lock control 403. As shown, the CPU module is disposed on a first portion of the attached computer module, and couples to connectors 17. Here, the CPU module is spatially located near connector 17.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, host interface controller 401 is coupled to BIOS/flash memory 405. Additionally, the host interface controller is coupled to a clock control logic, a configuration signal, and a peripheral bus. The present invention has a host interface controller that has lock control 403 to provide security features to the present ACM. Furthermore, the present invention uses a flash memory that includes codes to provide password protection or other electronic security methods.

The second portion of the attached computer module has the hard drive module 420. Among other elements, the hard drive module includes north bridge 421, graphics accelerator 423, graphics memory 425, a power controller 427, an IDE controller 429, and other components. Adjacent to and in parallel alignment with the hard drive module is a personal computer interface ("PCI") bus 431, 432. A power regulator 435 is disposed near the PCI bus.

In a specific embodiment, north bridge unit 421 often couples to a computer memory, to the graphics accelerator 423, to the IDE controller, and to the host interface controller via the PCI bus. Graphics accelerator 423 typically couples to a graphics memory 423, and other elements. IDE controller 429 generally supports and provides timing signals necessary for the IDE bus. In the present embodiment, the IDE controller is embodied as a 643U2 PCI-to IDE chip from CMD Technology, for example. Other types of buses than IDE are contemplated, for example EIDE, SCSI, 1394, and the like in alternative embodiments of the present invention.

The hard drive module or mass storage unit 420 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 420 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE. Among other features, the computer system includes an ACM with security protection. The ACM connects to the console, which has at least the following elements, which should not be limiting.

1) Connection to input devices, e.g. keyboard or mouse;
2) Connection to display devices, e.g. Monitor;
3) Add-on means, e.g. PCI add-on slots;
4) Removable storage media subsystem, e.g. Floppy drive, CDROM drive;
5) Communication device, e.g. LAN or modem;
6) An interface device and connectors to ACM;
7) A computer module bay with a notch in the frame for ACM's lock; and
8) Power supply and other accessories.

As noted, the computer module bay is an opening in a peripheral console that receives the ACM. The computer module bay provides mechanical support and protection to ACM. The module bay also includes, among other elements, a variety of thermal components for heat dissipation, a frame that provides connector alignment, and a lock engagement, which secures the ACM to the console. The bay also has a printed circuit board to mount and mate the connector from the ACM to the console. The connector provides an interface between the ACM and other accessories.

Figure 5:
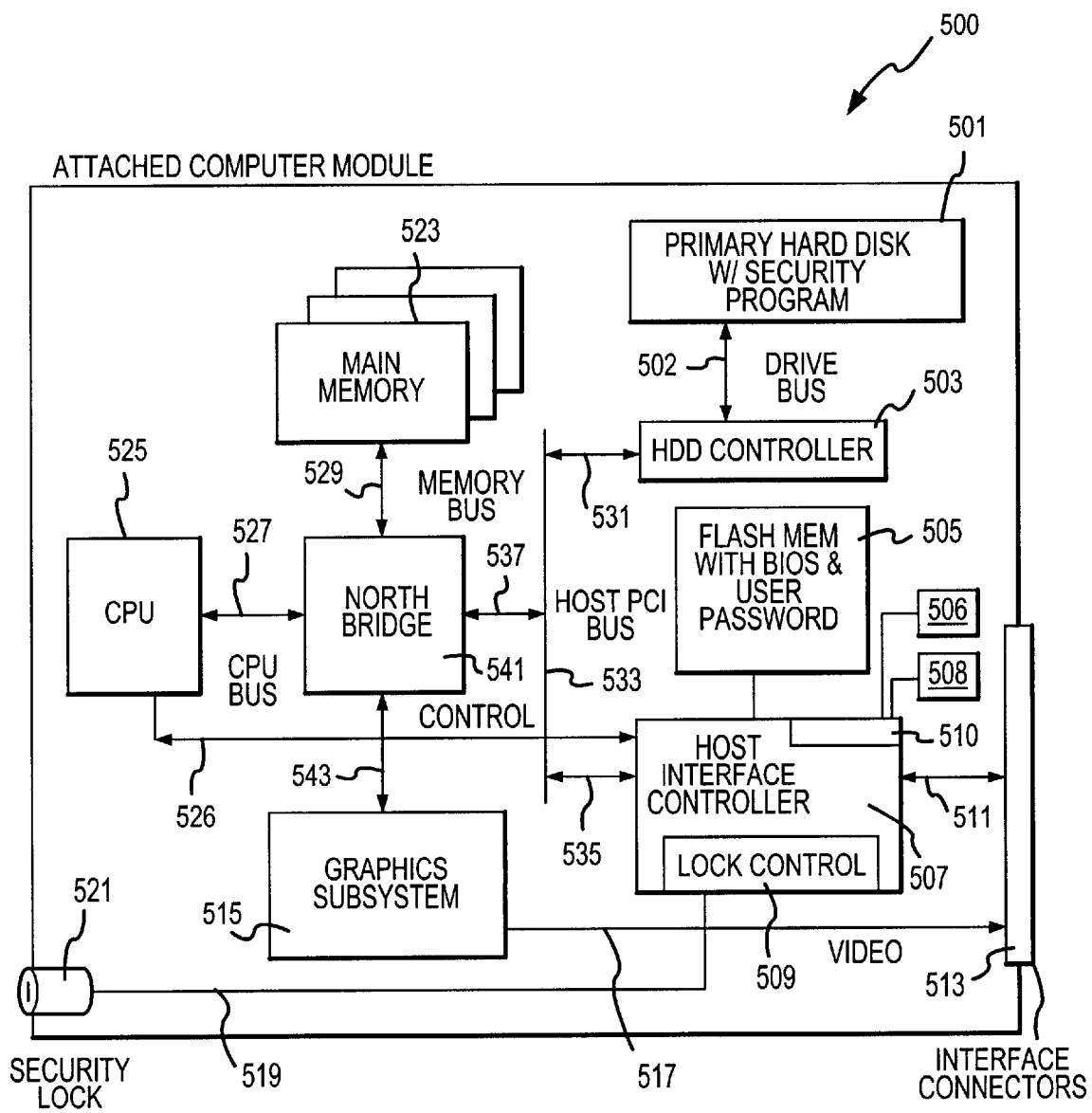
FIG. 5 is a simplified block diagram of a security system for a computer module according to an embodiment of the present invention.

FIG. 5 is a simplified block diagram 500 of a security system for a computer module according to an embodiment of the present invention. This diagram is merely an illustration and should not limit the scope of the claims herein. One of ordinary skill in the art would recognize other variations, modifications, and alternatives. The block diagram 500 has a variety of features such as those noted above, as well as others. In the present diagram, different reference numerals are used to show the operation of the present system.

The block diagram is an attached computer module 500. The module 500 has a central processing unit, which communicates to a north bridge 541, by way of a CPU bus 527. The north bridge couples to main memory 523 via memory bus 529. The main memory can be any suitable high speed memory device or devices such as dynamic random access memory ("DRAM") integrated circuits and others. The DRAM includes at least 32 Meg. or 64 Meg. and greater of memory, but can also be less depending upon the application. Alternatively, the main memory can be coupled directly with the CPU in some embodiments. The north bridge also couples to a graphics subsystem 515 via bus 542. The graphics subsystem can include a graphics accelerator, graphics memory, and other devices. Graphics subsystem transmits a video signal to an interface connector, which couples to a display, for example.

The attached computer module also includes a primary hard disk drive that serves as a main memory unit for programs and the like. The hard disk can be any suitable drive that has at least 2 GB and greater. As merely an example, the hard disk is a Marathon 2250 (2.25 GB, 2 ½ inch drive) product made by Seagate Corporation of Scotts Valley, but can be others. The hard disk communicates to the north bridge by way of a hard disk drive controller and bus lines 502 and 531. The hard disk drive controller couples to the north bridge by way of the host PCI bus, which connects bus 537 to the north bridge. The hard disk includes computer codes that implement a security program according to the present invention. Details of the security program are provided below.

The attached computer module also has a flash memory device 505 with a BIOS. The flash memory device 505 also has codes for a user password that can be stored in the device. The flash memory device generally permits the storage of such password without a substantial use of power, even when disconnected. As merely an example, the flash memory device has at least 4 Meg. or greater of memory, or 16 Meg. or greater of memory. A host interface controller 507 communications to the north bridge via bus 535 and host PCI bus. The host interface controller also has a lock control 509, which couples to a lock. The lock is attached to the module and has a manual override to the lock on the host interface controller in some embodiments. Host interface controller 507 communicates to the console using bus 511, which couples to connection 513.

Figure 5A:
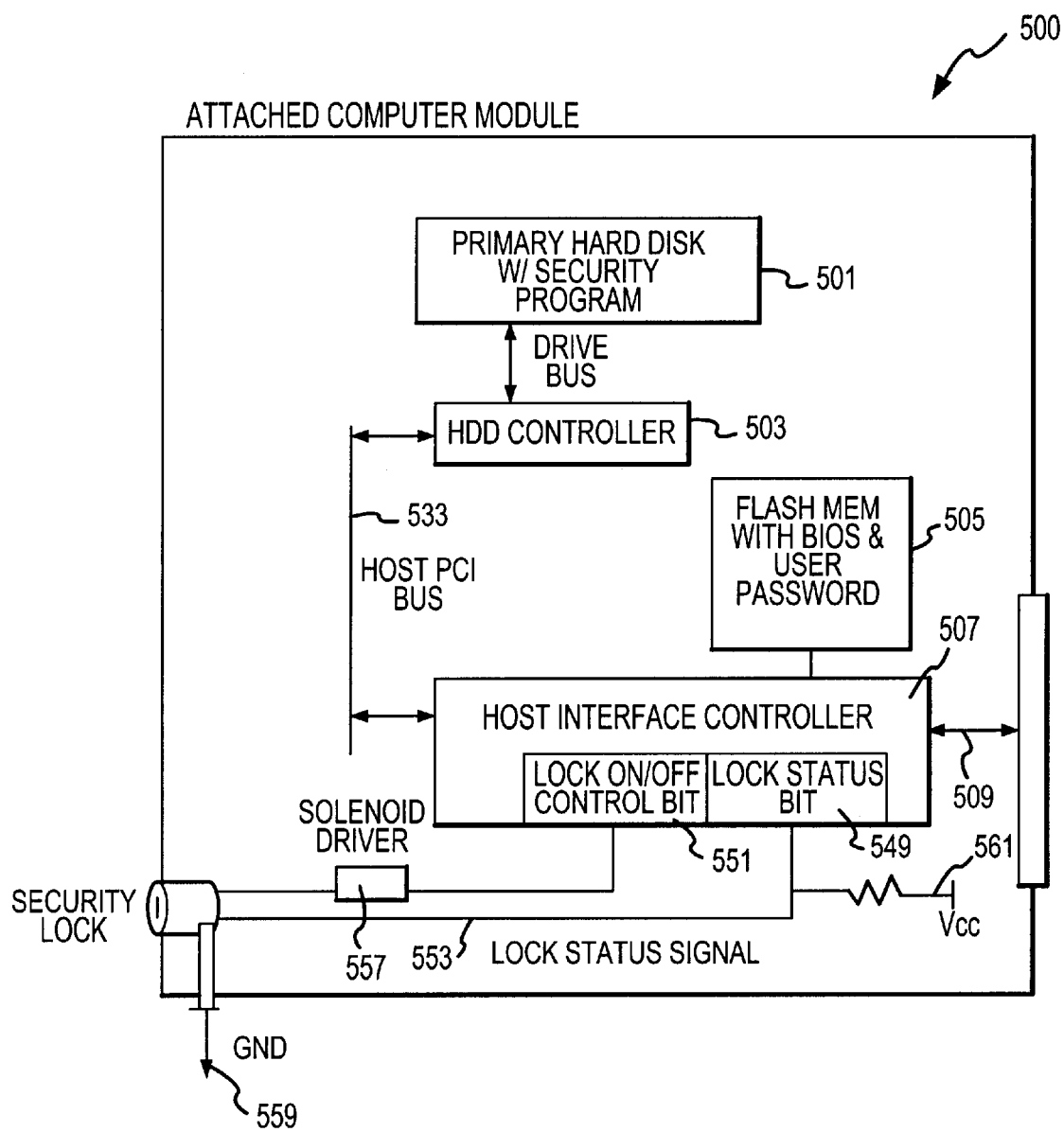

In one aspect of the present invention the security system uses a combination of electrical and mechanical locking mechanisms. Referring to FIG. 5A, for example, the present system provides a lock status mechanism in the host interface controller 509. The lock status of the lock is determined by checking a lock status bit 549, which is in the host interface controller. The lock status bit is determined by a signal 553, which is dependent upon the position of the lock. Here, the position of the lock is closed in the ground 559 position, where the latch couples to a ground plane in the module and/or system. Alternatively, the signal of the lock is at Vcc, for example, which is open. Alternatively, the signal can be ground in the open position and Vcc in the closed position, depending upon the application. Other signal schemes can also be used depending upon the application.

Once the status is determined, the host interface controller turns the lock via solenoid 557 in a lock on or lock off position, which is provided through the control bit 551, for example. The control bit is in a register of the host interface controller in the present example. By way of the signal schemes noted and the control bit, it is possible to place the lock in the lock or unlock position in an electronic manner. Once the status of the lock is determined, the host interface controller can either lock or unlock the latch on the module using a variety of prompts, for example.

In a preferred embodiment, the present invention uses a password protection scheme to electronically prevent unauthorized access to the computer module. The present password protection scheme uses a combination of software, which is a portion of the security program, and a user password, which can be stored in the flash memory device 505. By way of the flash memory device, the password does not become erased by way of power failure or the lock. The password is substantially fixed in code, which cannot be easily erased. Should the user desire to change the password, it can readily be changed by erasing the code, which is stored in flash memory and a new code (i.e., password) is written into the flash memory. An example of a flash memory device can include a Intel Flash 28F800F3 series flash, which is available in 8 Mbit and 16 Mbit designs. Other types of flash devices can also be used, however. Details of a password protection method are further explained below by way of the FIGS.

In a specific embodiment, the present invention also includes a real-time clock 510 in the ACM, but is not limited. The real-time clock can be implemented using a reference oscillator 14.31818 MHz 508 that couples to a real-time clock circuit. The real-time clock circuit can be in the host interface controller. An energy source 506 such as a battery can be used to keep the real-time clock circuit running even when the ACM has been removed from the console. The real-time clock can be used by a security program to perform a variety of functions. As merely an example, these functions include: (1) fixed time period in which the ACM can be used, e.g., ACM cannot be used at night; (2) programmed ACM to be used after certain date, e.g., high security procedure during owner's vacation or non use period; (3) other uses similar to a programmable time lock. Further details of the present real-time clock are described in the application listed under Ser. No. 09/183,816 noted above.

In still a further embodiment, the present invention also includes a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present password and user identification can be quite important for electronic commerce applications and the like. In one or more embodiments, the permanent password or user code can be combined with the password on flash memory for the security program, which is described below in more detail.

II. SECURITY DETECTION PROGRAMS

Figure 6:
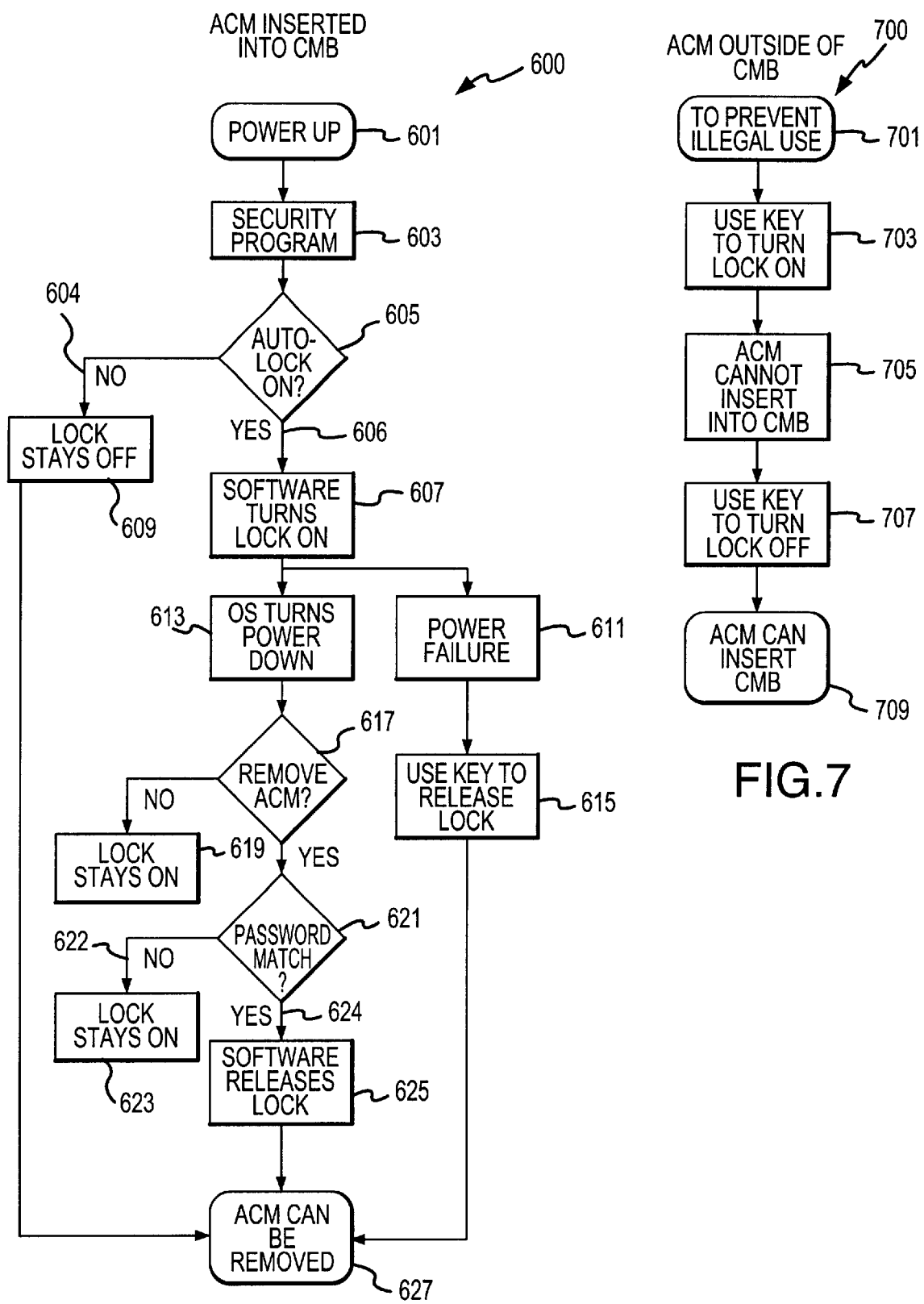
FIGS. 6 and 7 show simplified flow diagrams of security methods according to embodiments of the present invention.
Figure 7:
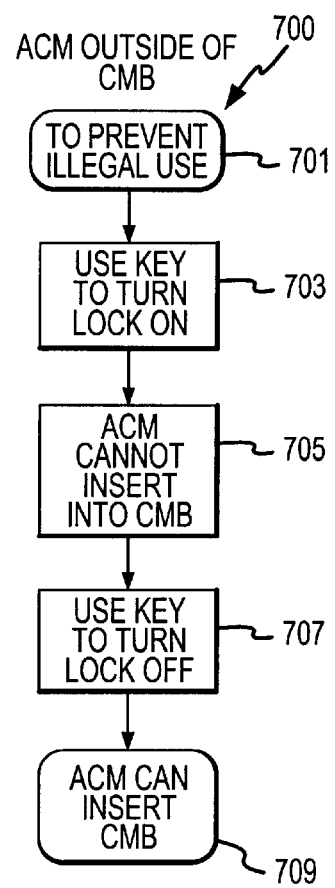

FIGS. 6 and 7 show simplified flow diagrams 600, 700 of security methods according to embodiments of the present invention. These diagrams are merely illustrations and should not limit the scope of the claims herein. One of ordinary skill in the art would recognize other variations, modifications, and alternatives. Referring to FIG. 6, which considers an example for when the ACM is inserted into the computer module bay in the console, ACM has already been inserted into the console and is firmly engaged in an electrical and mechanical manner. A computer system is powered up 601, which provides selected signals to the microprocessor. The microprocessor oversees the operation of the computer system. The microprocessor searches the memory in, for example, the hard disk drive and execute a security program, step 603.

The security program runs through a sequence of steps before allowing a user to operate the present system with the ACM. Among other processes, the security program determines if an "Auto-lock" is ON. If so, the security program goes via branch 606 to step 607. Alternatively, the security program goes to step 609, which determines that the lock stays OFF and loops to step 627, which indicates that the ACM can be removed physically from the console. In step 607, the security program turns a switch or switching means that turns ON a lock, which can be electrical, mechanical, or a combination of electrical and mechanical.

In a specific embodiment, the security program turns OFF the power of the ACM and console. Here, the security program directs the OS to turn the power OFF, step 613. In an embodiment where power failure occurs (step 611), a key is used to release a latch in the ACM on the lock 615, where the ACM can be removed, step 627. From step 613, the security program determines if the ACM is to be removed, step 617. If not, the lock stays ON, step 619. Alternatively, the security detection program determines if the password (or other security code) matches with the designated password, step 621. If not, the lock stays ON, step 623. Alternatively, the security program releases the lock 625, which frees the ACM. Next, the ACM can be removed, step 627.

In an alternative embodiment, the present invention provides a security system for the ACM, which is outside the console or computer module bay. See, FIG. 7, for example. As shown, the security system is implemented to prevent illegal or unauthorized use (step 701) of the ACM, which has not been used in the console. Here, a key turns ON a lock (step 703). The lock moves a latch in the ACM to a specific spatial location that physically blocks the passage of the ACM into the computer module bay. Accordingly, the ACM cannot insert (step 705) into the computer module bay.

In an alternative aspect, the key can be used to turn the lock OFF, step 707. Here, the key moves the latch in a selected spatial location that allows the ACM to be inserted into the computer bay module. In the OFF position, the ACM inserts into the computer module bay, step 709. Once the ACM is in the bay, a user can begin operating the ACM through the console. In one embodiment, the computer console including the ACM goes through the sequence of steps in the above FIG., but is not limited.

In a specific embodiment, the present invention implements the sequences above using computer software. In other aspects, computer hardware can also be used and is preferably in some applications. The computer hardware can include a mechanical lock, which is built into the ACM. An example of such mechanical lock is shown above, but can also be others. In other aspects, the lock can be controlled or accessed electronically by way of computer software. Here, the key can be used to as a manual override if the ACM or computer fails.

The lock is used to prevent theft and accidental removal inside CMB. The current invention locates the lock inside the ACM to allow a user to keep a single key as ACM is moved from console to console at different locations. When ACM is in transit, the lock can be engaged using the key so that the latch extends outside ACM's enclosure. The extended latch prevents ACM from being inserted into any CMB. This prevents any illegal use of ACM by someone other than the user.

In one aspect of the invention, the user password is programmable. The password can be programmable by way of the security program. The password can be stored in a flash memory device within the ACM. Accordingly, the user of the ACM and the console would need to have the user password in order to access the ACM. In the present aspect, the combination of a security program and user password can provide the user a wide variety of security functions as follows:

1) Auto-lock capability when ACM is inserted into CMB;
2) Access privilege of program and data;
3) Password matching for ACM removal; and
4) Automatic HDD lock out if tempering is detected.

In still a further embodiment, the present invention also includes a method for reading a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present method allows a third party confirm the user by way of the permanent password or user code. The present password and user identification can be quite important for electronic commerce applications and the like, which verify the user code or password. In one or more embodiments, the permanent password or user code can be combined with the password on flash memory for the security program.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer module, said module comprising:
    an enclosure, said enclosure being insertable into a console;
    a central processing unit in said enclosure, said central processing unit comprising a microprocessor based integrated circuit chip;
    a hard disk drive in said enclosure, said hard disk drive being coupled to said central processing unit; and
    a programmable memory device in said enclosure, said programmable memory device being configurable to store a password for preventing a possibility of unauthorized use of said hard disk drive.

2. The computer module of claim 1 further comprising a host interface controller for providing a status of a locking device in said enclosure.

3. The computer module of claim 1 further comprising a mechanical locking device that is coupled to said programmable memory device.

4. The computer module of claim 1 further comprising a host interface controller coupled to a mechanical locking device, said host interface controller being coupled to said programmable memory device.

5. The computer module of claim 1 wherein said programmable memory device comprises a flash memory device.

6. The computer module of claim 1 wherein said programmable memory device comprises a flash memory device having at least 8 Mbits of cells and greater.

7. The computer module of claim 1 further comprising a security program in a main memory.

8. The computer module of claim 7 wherein said security program comprises a code for storing a password on said programmable memory device.

9. The computer module of claim 8 wherein said security program comprises a code for checking a time from said real-time clock circuit.

10. The computer module of claim 1 further comprising a host interface controller coupled to a solenoid that drives a mechanical lock in a first position to a second position.

11. The computer module of claim 10 wherein said solenoid also drives said mechanical lock from said second position to said first position.

12. The computer module of claim 1 further comprising a real-time clock circuit coupled to said central processing unit.

13. The computer module of claim 12 further comprising a battery coupled to a host interface controller that includes said real-time clock.

14. A method for operating a computer system, said method comprising:
    inserting an attached computer module ("ACM") into a bay of a modular computer system, said ACM comprising a microprocessor unit coupled to a mass memory storage device;
    applying power to said computer system and said ACM to execute a security program, said security program being stored in said mass memory storage device; and
    prompting for a user password from a user on a display.

15. The method of claim 14 wherein said ACM comprises an enclosure that houses said microprocessor unit and said mass memory storage device.

16. The method of claim 14 further comprising providing a user password to said security program.

17. The method of claim 14 further comprising a flash memory device for storing a desired password for said ACM.

18. The method of claim 17 wherein said flash memory device maintains said desired password when power is removed from said ACM.

19. The method of claim 18 wherein said flash memory device is coupled to a host interface controller that is coupled to said microprocessor based unit.

20. The method of claim 14 wherein said mass memory storage device comprises a code directed to comparing said user password with a desired password.

21. The method of claim 14 further comprising identifying a permanent password or user code on said attached computer module.

22. The method of claim 21 wherein said permanent password or user code is stored in said microprocessor unit.

23. The method of claim 21 wherein said permanent password or user code is stored in a flash memory device coupled to said microprocessor unit.

* * * * *